(12) United States Patent
Pan

(10) Patent No.: US 12,468,419 B2
(45) Date of Patent: Nov. 11, 2025

(54) METHOD AND APPARATUS FOR DETERMINING TOUCH POSITION, AND ELECTRONIC DEVICE

(71) Applicant: VIVO MOBILE COMMUNICATION CO., LTD., Dongguan (CN)

(72) Inventor: Shan Pan, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 8 days.

(21) Appl. No.: 18/430,022

(22) Filed: Feb. 1, 2024

(65) Prior Publication Data

US 2024/0176445 A1 May 30, 2024

Related U.S. Application Data

(63) Continuation of application No. PCT/CN2022/109179, filed on Jul. 29, 2022.

(30) Foreign Application Priority Data

Aug. 2, 2021 (CN) .......................... 202110881968.X

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC ...... G06F 3/04166; G06F 3/044; G06F 3/041; G06F 3/0446
See application file for complete search history.

(56) References Cited

U.S. PATENT DOCUMENTS

| 9,218,097 | B2* | 12/2015 | Hsu | G06F 3/04166 |
| 2013/0162593 | A1* | 6/2013 | Inoue | G06F 3/04166 |
| | | | | 345/174 |
| 2013/0222337 | A1* | 8/2013 | Lee | G06F 3/04166 |
| | | | | 345/174 |
| 2013/0321334 | A1* | 12/2013 | Yoshida | G06F 3/04186 |
| | | | | 345/174 |
| 2015/0116256 | A1* | 4/2015 | Hsu | G06F 3/04166 |
| | | | | 345/174 |
| 2017/0003814 | A1* | 1/2017 | Park | G06F 3/0412 |

(Continued)

FOREIGN PATENT DOCUMENTS

| CN | 106951132 A | 7/2017 |
| CN | 109976588 A | 7/2019 |

(Continued)

*Primary Examiner* — Amy Onyekaba
(74) *Attorney, Agent, or Firm* — The Webb Law Firm

(57) ABSTRACT

A method for determining a touch position includes receiving a touch input by a user; in response to the touch input, obtaining a first data matrix of a display, the first data matrix being a matrix including capacitance data of the display; in a case that the first data matrix meets a first preset condition, performing first processing on the first data matrix to obtain a second data matrix; and determining, based on the second data matrix, coordinate information of a touch point corresponding to the touch input. The first preset condition includes that a trigger matrix corresponding to the first data matrix meets a second preset condition, where the trigger matrix is determined based on the first data matrix.

15 Claims, 8 Drawing Sheets

(56) References Cited

U.S. PATENT DOCUMENTS

| | | | |
|---|---|---|---|
| 2017/0192555 A1* | 7/2017 | Li | G06F 3/04166 |
| 2019/0050079 A1* | 2/2019 | Wang | G06F 3/041662 |
| 2020/0183531 A1 | 6/2020 | Langlotz | |
| 2022/0137754 A1* | 5/2022 | Wang | G06F 3/041661 |
| | | | 345/174 |
| 2022/0197503 A1* | 6/2022 | Liu | G06F 3/038 |
| 2023/0012245 A1* | 1/2023 | Li | G06F 3/0488 |

FOREIGN PATENT DOCUMENTS

| | | |
|---|---|---|
| CN | 111831144 A | 10/2020 |
| CN | 113138684 A | 7/2021 |

\* cited by examiner

METHOD AND APPARATUS FOR DETERMINING TOUCH POSITION, AND ELECTRONIC DEVICE

CROSS-REFERENCE TO RELATED APPLICATIONS

This application is a Bypass Continuation Application of International Patent Application No. PCT/CN2022/109179, filed Jul. 29, 2022, and claims priority to Chinese Patent Application No. 202110881968.X, filed Aug. 2, 2021, the disclosures of which are hereby incorporated by reference in their entireties.

BACKGROUND OF THE INVENTION

Field of the Invention

This application pertains to the field of electronic technology and relates to a method and apparatus for determining a touch position, and an electronic device.

Description of Related Art

With the development of electronic technology, electronic devices equipped with touchscreen technology have been most widely used in the market, and users can operate the electronic devices simply by performing actions on the touchscreen.

At present, most touchscreens are capacitive touch panels (CTP), which are suitable for multi-touch input. When a user touches a capacitive touch panel, the current and capacitance values on the touch panel undergo a series of physical transformations, resulting in a matrix of raw data related to electrode arrangement. By subtracting baseline signal values of the CTP from the raw data, a diff matrix that characterizes a signal difference before and after the touch operation on the touch panel is obtained. The diff matrix is then processed by complex touch algorithms as an input to determine coordinate information of the touch point.

SUMMARY OF THE INVENTION

Embodiments of this application provide a method and apparatus for determining a touch position, and an electronic.

According to a first aspect, an embodiment of this application provides a method for determining a touch position. The method includes: receiving a touch input by a user; in response to the touch input, obtaining a first data matrix of a display, the first data matrix being a matrix including capacitance data of the display; in a case that the first data matrix meets a first preset condition, performing first processing on the first data matrix to obtain a second data matrix; and determining, based on the second data matrix, coordinate information of a touch point corresponding to the touch input; where the first preset condition includes: that a trigger matrix corresponding to the first data matrix meets a second preset condition, where the trigger matrix is determined based on the first data matrix.

According to a second aspect, an embodiment of this application provides an apparatus for determining a touch position. The apparatus includes a receiving module, an obtaining module, a processing module, and a determining module, where the receiving module is configured to receive a touch input by a user; the obtaining module is configured to: in response to the touch input received by the receiving module, obtain a first data matrix of a display, the first data matrix being a matrix including capacitance data of the display; the processing module is configured to: in a case that the first data matrix meets a first preset condition, perform first processing on the first data matrix obtained by the obtaining module to obtain a second data matrix; and the determining module is configured to determine, based on the second data matrix obtained by the processing module, coordinate information of a touch point corresponding to the touch input; where the first preset condition includes: that a trigger matrix corresponding to the first data matrix meets a second preset condition, where the trigger matrix is determined based on the first data matrix.

According to a third aspect, an embodiment of this application provides an electronic device, where the electronic device includes a processor, a memory, and a program or instruction stored in the memory and capable of running on the processor, and when the program or instruction is executed by the processor, the steps of the method according to the first aspect are implemented.

According to a fourth aspect, an embodiment of this application provides a non-transitory readable storage medium, where the non-transitory readable storage medium stores a program or instruction, and when the program or instruction is executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or instruction to implement the method according to the first aspect.

According to a sixth aspect, an embodiment of this application provides a computer program product, where the program product is stored in a non-transient storage medium, and the program product is executed by at least one processor to implement the method according to the first aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that data used in this way are interchangeable in appropriate circumstances such that the embodiments of this application can be implemented in an order other than those illustrated or described herein. In addition, "first" and "second" are typically used to distinguish objects of a same type and do not limit quantities of the objects. For example, there may be one or more first objects. In addition, "and/or" in the specification and claims represents at least one of connected objects, and the character "/" generally indicates that the contextually associated objects have an "or" relationship.

In the related art, electronic devices equipment with touchscreens may experience poor production in the assembly process, or may have poor contact between the metal frame on the back of the display module (LCM) and the ground (GND) terminal of the electronic device due to drops in use or extended usage. When the iron frame of the LCM has unstable contact with the GND, the raw data obtained by scanning becomes unstable and exhibits abrupt changes. This leads to all diff values being elevated (greater than a point report threshold of 140). In such cases, directly using this data for touch point coordinate calculation would render the touchscreen non-functional as all touch points are falsely reported or result in erratic touch inputs. Consequently, the touchscreen may fail to respond upon wake-up or exhibit low accuracy in touch input, resulting in poor user experience.

The following describes a method for determining a touch position provided in the embodiments of this application by using some embodiments and application scenarios thereof with reference to the accompanying drawings.

Figure 1:
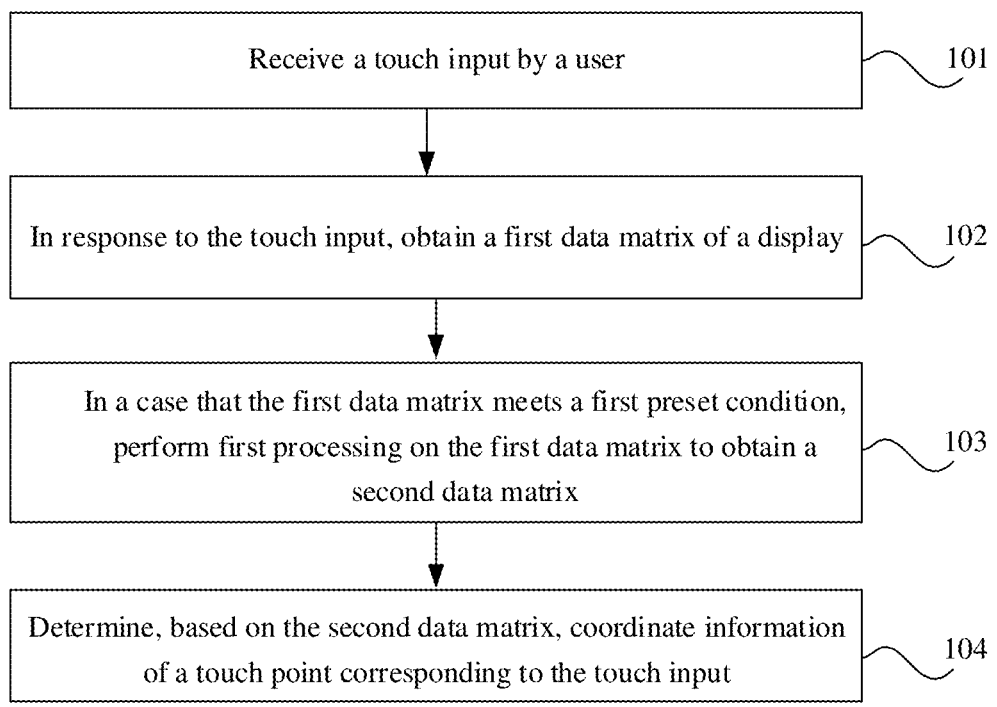
FIG. 1 is a flowchart of a method for determining a touch position according to an embodiment of this application.

An embodiment of this application provides a method for determining a touch position. The method for determining a touch position may be applied to an electronic device. FIG. 1 shows a flowchart of the method for determining a touch position according to this embodiment of this application. As shown in FIG. 1, the method for determining a touch position according to this embodiment of this application may include the following steps 101 to 104.

Step 101. Receive a touch input by a user.

An initial data matrix is used for characterizing variation of capacitance data upon reception of a touch operation on a touchscreen.

It should be noted that the reception of a touch operation refers to reception of a touch by a human body part (for example, a finger) or touch by other objects (for example, a stylus). The capacitance data of the touchscreen varies before and after the reception of touches, so that a position of a touch point can be determined by detecting the variation of the capacitance data.

Step 102. In response to the touch input, obtain a first data matrix of a display.

The first data matrix is a matrix including capacitance data of the display.

In this embodiment of this application, the first data matrix is used for characterizing variation of capacitance data upon reception of a touch operation on the touchscreen or variation of capacitance data in absence of any touch operations on the touchscreen.

It should be noted that since the first data matrix reflects initial capacitance data of the display in the presence or absence a touch event, the first data matrix may also be described as an initial data matrix.

In an embodiment of this application, the touch input may be any feasible input such as tapping, sliding, or pressing. This is not limited in the embodiments of this application.

In an embodiment of this application, the display may be a touchscreen. For example, the display may be a capacitive touch panel. Optionally, the touchscreen includes a capacitance matrix formed by a plurality of electrodes, where the plurality of electrodes include a number of electrodes in a direction x and a number of electrodes in a direction y.

Figure 2A:
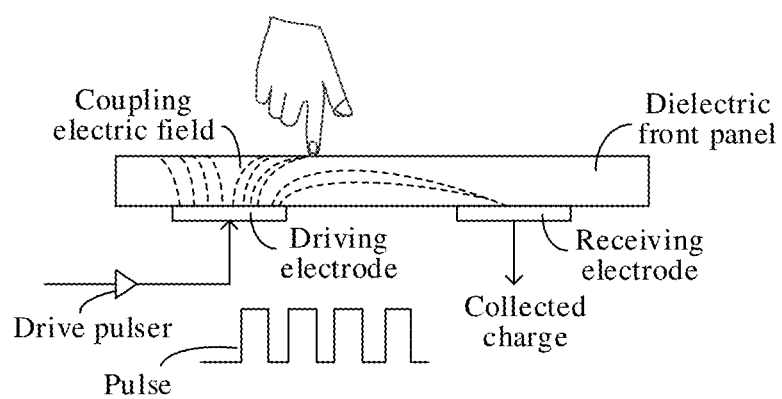
FIG. 2A shows a schematic diagram of hardware of touch input on a capacitive panel according to an embodiment of this application.
Figure 2B:
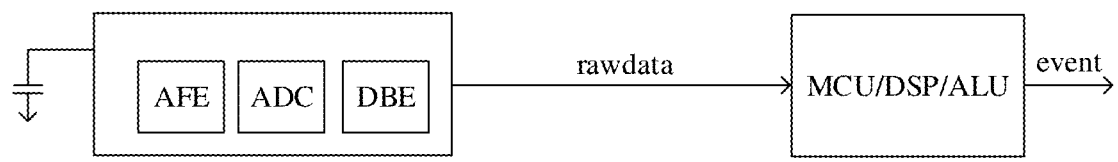
FIG. 2B shows a system block diagram of touch input on a capacitive panel according to an embodiment of this application.

It should be noted that the capacitive touch panel (referred to as a capacitive panel) is operated by any charge-carrying object including the human skin. When a finger touches the capacitive panel, a high-frequency signal is connected on an operation surface of the capacitive panel, and the finger and the operation surface of the capacitive panel form a coupling capacitor serving as a conductor. When touching the capacitive panel, the finger absorbs a small amount of current from a contact point, and the small amount of current flows from the electrodes of the capacitive panel, resulting in voltage drop in the electrodes at the corners of the capacitive panel, thereby implementing a touch input through sensing of the weak current of the human body. For ease of understanding, FIG. 2A is a schematic diagram of operation hardware of a capacitive touch panel, and FIG. 2B is a system block diagram in which an operation flowchart of a touch input on the capacitive panel is summarized. In this flow, an excitation signal is added to one electrode of a capacitor of a touch panel sensor, and the other electrode of the capacitor is connected to an analog front end (AFE) of a touch panel controller, the output of the AFE is transformed into raw data in a digital format by an analog-to-digital converter (ADC) and a digital back-end (DBE), and the raw data is processed in a digital signal processor (DSP), a micro-controller unit (MCU), or an arithmetic logic unit (ALU).

In an embodiment of this application, the first data matrix includes at least one piece of initial capacitance data (which may also be described as raw data of capacitance), which may be referred to as initial diff data or diff data. For example, the first data matrix is determined based on a raw data matrix corresponding to the raw data of capacitance on the touchscreen and a data matrix corresponding to baseline capacitance values (which may also be referred to as baseline capacitance data) of the touchscreen. Optionally, the first data matrix is a difference between the raw data matrix corresponding to the raw data of capacitance and the data matrix corresponding to the baseline capacitance values.

Optionally, the first data matrix includes L second element groups, where each second element group includes R second elements. The first data matrix is a matrix of L×R (which may also be described as l-row-r-column), which may be denoted as DIFF_Before$_{l\times r}$ in practical operation. Optionally, the number of rows and the number of columns are related to the number of the electrodes distributed on the touchscreen.

It should be noted that in the related art, a touch point position on a touchscreen can be determined based on variations of capacitance on the display, and since the variations are determined based on the raw data of capacitance and baseline capacitance values on the display, the raw data of capacitance obtained by scanning exhibits abrupt changes in circumstances of unstable contact between a display module and a grounding terminal, while the baseline capacitance values are substantially unchanged, resulting in significantly elevated (increased) capacitance variation values, and consequently, an inaccurate touch point position is obtained. For example, when a user touches a zone of the touchscreen, if the display is in an unstably grounded state, the value magnitudes of diff data of a touch point position of the user, which is obtained through computation by the user, are elevated, resulting in an inaccurate touch point position obtained through computation on the diff data.

Optionally, in an embodiment of this application, a touch chip (that is, a touch ic) can scan the capacitor matrix of the entire touchscreen through row scanning or column scanning to generate a raw data matrix, and then obtain the foregoing first data matrix by subtracting the baseline data matrix corresponding to the baseline capacitance values from the raw data matrix.

For example, the baseline capacitance values are capacitance values predetermined based on parameters of hardware of the touchscreen, which may be regarded as capacitance values detected in absence of any touch on the touchscreen. Optionally, a data matrix corresponding to the baseline capacitance values is a preset data matrix.

In an embodiment of this application, under unstable grounding of the touchscreen, a conclusion, which indicates a strong correlation between the data pattern of abrupt changes in the initial data and the scanning mode, is drawn by analyzing the scanning mode of the touch ic and the obtained initial data (for example, the foregoing initial capacitance data). Optionally, if scanning is performed row by row, the initial capacitance data is elevated row by row; or if scanning is performed column by column, the initial capacitance data is elevated column by column. In addition, it should be noted that the elevated initial capacitance data has good consistency, that is, the values of the initial capacitance data of the entire display are consistently increased. Therefore, this feature is employed in the detection for scenarios with unstable grounding. Table 1 and Table 2 respectively show initial capacitance data obtained in absence of any touch and in reception of a one-finger touch on the touchscreen under the condition of unstable grounding.

It should be noted that when the touchscreen receives a touch under a normal condition, the values of the diff data corresponding to the zone receiving the touch are elevated to be greater than those of other zones, while values of the diff data of other zones remain substantially unchanged; when the touchscreen receives a touch in the event of an anomaly (for example, unstable grounding), the values of the diff data of the entire touchscreen zone are significantly elevated, while the values of the diff data corresponding to the zone receiving the touch are elevated.

TABLE 1

| diff data under unstable grounding in absence of any touch | | | | | | | | | | | | | | | | | |
|---|---|---|---|---|---|---|---|---|---|---|---|---|---|---|---|---|---|
| 157 | 158 | 157 | 156 | 159 | 157 | 156 | 161 | 0 | 0 | 156 | 156 | 155 | 156 | 159 | 158 | 158 | 158 |
| 154 | 150 | 151 | 153 | 153 | 151 | 151 | 151 | 151 | 151 | 153 | 151 | 152 | 152 | 153 | 153 | 152 | 153 |
| 160 | 159 | 159 | 159 | 159 | 157 | 159 | 163 | 157 | 158 | 157 | 159 | 158 | 159 | 158 | 160 | 158 | 159 |
| 160 | 155 | 155 | 156 | 157 | 158 | 155 | 158 | 157 | 157 | 154 | 158 | 154 | 158 | 159 | 154 | 156 | 159 |
| 149 | 151 | 150 | 151 | 150 | 151 | 152 | 149 | 151 | 147 | 150 | 149 | 150 | 151 | 151 | 149 | 149 | 150 |
| 151 | 149 | 148 | 148 | 152 | 150 | 148 | 150 | 149 | 155 | 152 | 146 | 151 | 152 | 150 | 153 | 148 | 150 |
| 153 | 157 | 152 | 151 | 155 | 154 | 153 | 154 | 155 | 154 | 154 | 153 | 154 | 154 | 153 | 155 | 152 | 155 |
| 150 | 152 | 151 | 148 | 152 | 153 | 151 | 152 | 154 | 149 | 150 | 151 | 152 | 151 | 153 | 150 | 152 | 152 |
| 157 | 158 | 157 | 158 | 158 | 156 | 158 | 158 | 161 | 158 | 162 | 158 | 159 | 159 | 159 | 158 | 156 | 165 |
| 151 | 153 | 150 | 151 | 149 | 151 | 154 | 152 | 151 | 149 | 153 | 150 | 149 | 155 | 151 | 151 | 149 | 151 |
| 152 | 157 | 152 | 150 | 151 | 155 | 150 | 150 | 151 | 150 | 151 | 150 | 150 | 149 | 151 | 150 | 150 | 150 |
| 153 | 155 | 154 | 152 | 153 | 153 | 153 | 149 | 153 | 153 | 154 | 153 | 154 | 158 | 155 | 155 | 153 | 153 |
| 157 | 158 | 154 | 158 | 158 | 158 | 158 | 159 | 157 | 159 | 161 | 158 | 160 | 159 | 159 | 159 | 157 | 159 |
| 160 | 157 | 155 | 156 | 156 | 155 | 157 | 155 | 157 | 157 | 156 | 156 | 156 | 159 | 158 | 156 | 154 | 155 |
| 157 | 153 | 151 | 152 | 153 | 155 | 154 | 153 | 151 | 155 | 156 | 154 | 153 | 157 | 153 | 153 | 152 | 153 |
| 162 | 157 | 158 | 156 | 158 | 159 | 158 | 158 | 159 | 158 | 159 | 160 | 157 | 159 | 158 | 159 | 159 | 157 |
| 156 | 155 | 157 | 154 | 156 | 156 | 156 | 155 | 156 | 156 | 156 | 154 | 156 | 154 | 156 | 161 | 157 | 157 |
| 158 | 163 | 166 | 160 | 159 | 158 | 158 | 158 | 158 | 159 | 158 | 158 | 159 | 157 | 157 | 159 | 161 | 162 |
| 166 | 166 | 161 | 164 | 165 | 161 | 164 | 166 | 164 | 166 | 164 | 164 | 163 | 162 | 164 | 164 | 164 | 163 |
| 141 | 141 | 142 | 141 | 141 | 142 | 146 | 144 | 142 | 142 | 142 | 140 | 142 | 140 | 141 | 142 | 144 | 143 |
| 157 | 158 | 158 | 158 | 159 | 158 | 158 | 159 | 158 | 157 | 158 | 159 | 157 | 158 | 157 | 158 | 157 | 156 |
| 161 | 163 | 166 | 165 | 164 | 161 | 165 | 158 | 161 | 162 | 163 | 160 | 161 | 160 | 163 | 161 | 165 | 162 |
| 166 | 166 | 165 | 166 | 165 | 168 | 164 | 164 | 166 | 166 | 167 | 165 | 167 | 168 | 168 | 167 | 166 | 166 |
| 156 | 156 | 156 | 158 | 158 | 155 | 156 | 160 | 158 | 157 | 156 | 155 | 156 | 155 | 158 | 157 | 154 | 156 |
| 165 | 166 | 166 | 166 | 166 | 164 | 170 | 165 | 166 | 169 | 165 | 168 | 164 | 165 | 166 | 167 | 166 | 167 |
| 156 | 158 | 157 | 160 | 156 | 156 | 154 | 156 | 161 | 155 | 154 | 157 | 158 | 154 | 157 | 155 | 156 | 156 |
| 161 | 158 | 165 | 159 | 161 | 159 | 160 | 160 | 164 | 158 | 159 | 159 | 159 | 159 | 163 | 160 | 160 | 158 |
| 94 | 94 | 105 | 108 | 107 | 109 | 117 | 114 | 98 | 99 | 100 | 96 | 92 | 93 | 95 | 94 | 94 | 97 |
| 92 | 93 | 93 | 109 | 110 | 115 | 124 | 121 | 107 | 93 | 93 | 95 | 95 | 94 | 94 | 94 | 94 | 95 |

TABLE 1-continued

| | | | | | | | | diff data under unstable grounding in absence of any touch | | | | | | | | | |
|---|---|---|---|---|---|---|---|---|---|---|---|---|---|---|---|---|---|
| 93 | 102 | 98 | 120 | 111 | 125 | 108 | 119 | 106 | 99 | 94 | 91 | 94 | 92 | 94 | 93 | 93 | 95 |
| 133 | 131 | 133 | 131 | 136 | 131 | 134 | 132 | 132 | 134 | 130 | 130 | 131 | 131 | 133 | 132 | 131 | 134 |
| 146 | 144 | 146 | 146 | 147 | 147 | 147 | 145 | 147 | 147 | 143 | 146 | 144 | 146 | 148 | 147 | 146 | 147 |

TABLE 2

| | | | | | | | | diff data under unstable grounding in the event of a one-finger touch | | | | | | | | | |
|---|---|---|---|---|---|---|---|---|---|---|---|---|---|---|---|---|---|
| 166 | 160 | 160 | 168 | 165 | 161 | 170 | 17 | 0 | 0 | 169 | 168 | 166 | 167 | 168 | 164 | 161 | 162 |
| 157 | 153 | 154 | 166 | 161 | 164 | 155 | 173 | 171 | 166 | 162 | 158 | 159 | 155 | 159 | 155 | 155 | 154 |
| 165 | 162 | 164 | 160 | 162 | 164 | 164 | 167 | 169 | 178 | 161 | 167 | 168 | 170 | 167 | 168 | 161 | 164 |
| 159 | 166 | 159 | 158 | 163 | 157 | 161 | 159 | 163 | 176 | 172 | 160 | 163 | 158 | 161 | 160 | 158 | 160 |
| 152 | 153 | 155 | 152 | 157 | 151 | 151 | 159 | 156 | 163 | 163 | 156 | 156 | 155 | 155 | 158 | 154 | 156 |
| 151 | 153 | 156 | 153 | 149 | 153 | 154 | 157 | 164 | 164 | 156 | 157 | 154 | 156 | 154 | 152 | 155 | 155 |
| 160 | 161 | 160 | 155 | 157 | 159 | 160 | 156 | 163 | 168 | 160 | 159 | 157 | 158 | 155 | 157 | 159 | 155 |
| 152 | 151 | 155 | 158 | 151 | 160 | 151 | 158 | 157 | 164 | 158 | 157 | 157 | 151 | 150 | 154 | 153 | 157 |
| 159 | 164 | 161 | 159 | 158 | 159 | 158 | 162 | 171 | 169 | 166 | 161 | 159 | 159 | 158 | 162 | 163 | 171 |
| 154 | 157 | 153 | 154 | 152 | 152 | 153 | 162 | 163 | 165 | 164 | 161 | 158 | 153 | 154 | 155 | 158 | 161 |
| 158 | 159 | 160 | 151 | 151 | 160 | 151 | 152 | 162 | 162 | 161 | 159 | 156 | 153 | 153 | 154 | 153 | 152 |
| 170 | 162 | 158 | 166 | 167 | 167 | 158 | 168 | 157 | 174 | 160 | 158 | 158 | 160 | 157 | 159 | 166 | 156 |
| 165 | 165 | 167 | 166 | 162 | 172 | 160 | 161 | 162 | 171 | 171 | 161 | 162 | 162 | 160 | 159 | 162 | 160 |
| 170 | 160 | 167 | 160 | 166 | 171 | 171 | 168 | 175 | 178 | 169 | 160 | 158 | 159 | 163 | 159 | 162 | 160 |
| 160 | 157 | 172 | 163 | 162 | 158 | 169 | 164 | 173 | 171 | 173 | 155 | 154 | 157 | 158 | 155 | 156 | 156 |
| 168 | 167 | 174 | 164 | 175 | 170 | 184 | 181 | 171 | 181 | 171 | 166 | 168 | 163 | 161 | 163 | 162 | 160 |
| 174 | 160 | 169 | 174 | 178 | 177 | 180 | 169 | 177 | 183 | 174 | 163 | 170 | 162 | 167 | 164 | 161 | 163 |
| 176 | 174 | 167 | 180 | 170 | 168 | 170 | 179 | 183 | 172 | 173 | 168 | 166 | 164 | 162 | 160 | 162 | 163 |
| 173 | 166 | 176 | 168 | 176 | 179 | 184 | 174 | 179 | 183 | 170 | 170 | 166 | 167 | 165 | 166 | 169 | 171 |
| 144 | 144 | 143 | 148 | 142 | 143 | 145 | 153 | 161 | 154 | 148 | 160 | 148 | 148 | 149 | 143 | 154 | 144 |
| 165 | 172 | 168 | 158 | 165 | 166 | 163 | 158 | 164 | 174 | 165 | 163 | 159 | 163 | 161 | 158 | 166 | 162 |
| 166 | 165 | 165 | 167 | 165 | 167 | 167 | 169 | 169 | 174 | 166 | 164 | 165 | 161 | 163 | 163 | 167 | 166 |
| 172 | 167 | 169 | 173 | 167 | 170 | 172 | 171 | 178 | 178 | 173 | 172 | 167 | 168 | 166 | 168 | 170 | 171 |
| 160 | 167 | 159 | 172 | 160 | 163 | 169 | 176 | 176 | 175 | 171 | 171 | 162 | 161 | 161 | 160 | 160 | 161 |
| 172 | 171 | 171 | 174 | 176 | 175 | 171 | 196 | 201 | 203 | 194 | 170 | 172 | 178 | 166 | 174 | 167 | 168 |
| 158 | 170 | 172 | 174 | 174 | 184 | 186 | 295 | 559 | 508 | 250 | 183 | 168 | 162 | 159 | 170 | 161 | 169 |
| 174 | 176 | 183 | 170 | 182 | 199 | 231 | 715 | 1115 | 1105 | 620 | 220 | 189 | 175 | 168 | 167 | 175 | 171 |
| 105 | 109 | 103 | 122 | 123 | 135 | 183 | 636 | 1062 | 1064 | 803 | 191 | 121 | 109 | 111 | 111 | 105 | 111 |
| 102 | 103 | 109 | 117 | 110 | 130 | 156 | 259 | 686 | 973 | 634 | 183 | 112 | 100 | 106 | 101 | 102 | 98 |
| 91 | 99 | 104 | 119 | 122 | 122 | 131 | 160 | 218 | 291 | 210 | 134 | 119 | 101 | 95 | 97 | 102 | 100 |
| 140 | 132 | 131 | 133 | 136 | 149 | 146 | 157 | 172 | 185 | 173 | 155 | 150 | 138 | 142 | 143 | 138 | 136 |
| 149 | 145 | 148 | 149 | 149 | 148 | 165 | 159 | 168 | 173 | 172 | 164 | 166 | 165 | 146 | 156 | 148 | 160 |

Step 103. In a case that the first data matrix meets a first preset condition, perform first processing on the first data matrix to obtain a second data matrix.

Optionally, in an embodiment of this application, the first preset condition includes that a trigger matrix corresponding to the first data matrix meets a second preset condition, where the trigger matrix is determined based on the first data matrix.

Optionally, in an embodiment of this application, the trigger matrix is used for characterizing a degree of proximity of each row of data to an average value of the row of data. The trigger matrix may be determined based on the first data matrix and an average value matrix of the first data matrix.

For example, the trigger matrix includes L first element groups, with each first element group including R first elements, where both L and R are positive integers.

It should be noted that the first element group may be a row of elements or a column of elements, which may be determined based on an actual situation. For example, the matrix includes L first element groups, that is, the matrix includes L rows of elements. Each element group includes R elements, that is, the matrix includes L rows and R columns of elements, which may also be described as l-row-r-column.

For example, the average value matrix of the first data matrix is a new matrix obtained by taking an average value of each row of elements in the first data matrix and combining the average values of the rows of elements with an all-1 matrix, where the new matrix may be denoted as $A_{lxr}$. Optionally, the new matrix is used for reflecting the average values of the rows of data in the first data matrix.

For example, the apparatus for determining a touch position can obtain the trigger matrix based on the first data matrix and the average value matrix.

It should be noted that for the implementation of obtaining the trigger matrix based on the first data matrix, the description later herein can be a reference. Details are not further described now.

Optionally, in an embodiment of this application, the second preset condition includes that the trigger matrix includes a first number of first element groups, with each of the first number of first element groups including a second number of first elements, and an absolute value of each of the second number of first elements being less than a first preset threshold.

The first number is greater than a second preset threshold, and the second number is greater than a third preset threshold.

For example, the first number is used for indicating the number of third element groups. The first number may be a preset number or may be determined based on experimental data.

It should be noted that for ease of description, the first number may be denoted as C, the second number may be denoted as M, the first preset threshold may be denoted as D1, the second preset threshold may be denoted as C1, and the third preset threshold may be denoted as M1.

For example, after the difference between the first data matrix DIFF_Befor$_{lxr}$ and the average value matrix A$_{lxr}$ is taken to obtain the trigger matrix $\Delta_{lxr}$, an absolute value of each element in the matrix $\Delta_{lxr}$ may be taken to obtain an absolute value matrix $|\Delta_{lxr}|$ of the trigger matrix.

Optionally, the apparatus for determining a touch position can determine all elements in the matrix $|\Delta_{lxr}|$ row by row using a round-robin algorithm, and count rows meeting the condition using a variable count by adding 1 to the count when values of M elements (that is, first elements) in one row of $|\Delta_{lxr}|$ are determined to be less than the first preset threshold D1. The count where all the elements in $|\Delta_{lxr}|$ have gone through such determining is the foregoing C.

Optionally, if in $|\Delta_{lxr}|$, D<D1, M>M1, and count>C1 it is determined that the frame of data under processing in the first data matrix is data in an unstably grounded state. It should be noted that in actual processing, parameters are usually introduced to operations, where D, M and count are parameters, and D1, M1 and C1 are values corresponding to the parameters.

It should be clarified that, based on the relationship between the first data matrix and the trigger matrix, a touchscreen is deemed to have an unstable grounding issue if, in the first data matrix, there are more than C rows where at least M elements per row have an absolute difference from the row's average value that is less than D1.

It should be noted that the foregoing three parameters (that is, the first preset threshold, the second preset threshold, and the third preset threshold) are key parameters for detecting unstable grounding of the display module of the touchscreen, where D1 indicates the requirement for data consistency, and the smaller D1 leads to higher requirement for consistency, while the larger D1 leads to lower requirement for consistency; C1 and M1 determine the degree of difficulty of entering a scenario where unstable grounding occurs, with C1 indicating the minimum number of rows that satisfy the consistency, and M1 indicating the number of elements in a row that satisfy the data consistency; and larger values of C1 and M1 make it less likely to be determined as a scenario where unstable grounding occurs, while smaller values of C1 and M1 make it easier to be determined as a scenario where unstable grounding occurs.

It should be noted that the most appropriate thresholds of C1, D1, and M1 may be determined based on actual display parameters through experimental test and experimental verification.

In an optional embodiment, in a case that the touchscreen receives a one-finger touch, the touch IC performs a row scan on a click matrix of the touchscreen to obtain a raw data matrix of 32 rows multiplied by 18 columns, obtains a first data matrix DIFF_Before$_{lxr}$ based on raw data and a baseline data matrix, DIFF_Before$_{lxr}$ also being a matrix of 32 rows multiplied by 18 columns, obtains a trigger matrix $\Delta_{lxr}$ based on DIFF_Before$_{lxr}$ and the average value matrix A$_{lxr}$, and takes an absolute value of each element in the matrix $\Delta_{lxr}$ to obtain an absolute value matrix $|\Delta_{lxr}|$ of the trigger matrix. As shown in Table 2, $|\Delta_{lxr}|$ includes diff data of 32 rows and 18 columns. Thus, when it is determined whether unstable grounding occurs in the touchscreen, the value of C1 may be 5, the value of D1 may be determined based on a point report threshold, for example, the value of D1 is 40, and the value of M1 may be greater than 80% of the number of columns, for example, the value of M1 is 14. In addition, in a case that $\Delta_{lxr}$ meets the above condition, it may be determined that unstable grounding has occurred, that is, the touchscreen is experiencing an anomaly.

It should be noted that in an optional embodiment, in a case that unstable grounding occurs in the touchscreen, data obtained by scanning of the touch IC is characterized by being elevated on the entire display. Therefore, the key to the processing is to filter out the data variations caused by unstable grounding, that is, to remove the baseline noise.

Optionally, in an embodiment of this application, the first processing may be a filtering processing. For example, the first processing may include any one of the following manner 1 and manner 2.

Manner 1: Baseline noise is measured using an average value and a minimum value, and baseline noise in data is filtered out.

For example, the apparatus for determining a touch position can determine an average value or minimum value of first elements in a first element group in the first data matrix, and the average value or minimum value of the first elements in the first element group is used as an estimate value of the baseline noise of the first element group, and then the baseline noise is filtered out by a filter based on the estimate value of the baseline noise.

Optionally, for example, the first data matrix is a data matrix with l rows and r columns. The apparatus for determining a touch position can determine a minimum value or average value of each row of data as the estimate value of the baseline noise, then construct, based on the determined estimate value of the baseline noise in the row of data, a suitable filter to filter out the noise (which is the baseline noise) in the row of data, and obtain a data matrix without noise (which is the second data matrix).

Optionally, the apparatus for determining a touch position can determine at least one first element group meeting the second preset condition in R first element groups in the first data matrix as a target element group. The target element group is an element group in the R first element groups that includes more than MI elements having a value of less than D1, that is, an element group meeting the requirement for data consistency.

Optionally, an average value of each of at least one target element groups may be determined as an estimate value of baseline noise of a corresponding target element group; and a minimum value of each of element groups in the R first element groups other than the target element group is determined as an estimate value of baseline noise of a corresponding element group.

It should be noted that using the minimum value of this row as the estimate value of the baseline noise can retain the original characteristics of the data and effectively avoid data variations caused by finger touch.

Manner 2: Baseline noise is measured using an average value without touch data, and baseline noise in data is filtered out.

For example, the apparatus for determining a touch position can determine, based on a preset threshold, an average value of elements within the threshold in a first element group in the first data matrix, as an estimate value of the baseline noise of the corresponding first element group, and then the baseline noise is filtered out by a filter based on the estimate value of the baseline noise.

Optionally, for example, the first data matrix is a data matrix with l rows and r columns. The apparatus for determining a touch position can set the threshold to n in advance, then take an average value of values within the threshold and use the average value as a created estimate value, and finally, construct, based on the determined estimate value of the baseline noise, a suitable filter to filter out the noise (which is the baseline noise) in the data, and obtain a data matrix without noise (which is the second data matrix).

Optionally, the second data matrix obtained by filtering the first data matrix in manner 2 has an expression as follows:

$$\text{DIFF\_New}_{lxr} = \text{DIFF\_Before}_{lxr} - \begin{bmatrix} \text{mean}(\{X|X \in l_1, X < n\}) & \cdots & \text{mean}(\{X|X \in l_1, X < n\}) \\ & \ddots & \\ \text{mean}(\{X|X \in l_r, X < n\}) & \cdots & \text{mean}(\{X|X \in l_r, X < n\}) \end{bmatrix}, \quad (1.1)$$

where $\text{DIFF\_New}_{lxr}$ represents the second data matrix, $l_l$ represents the 1st row of elements in the first data matrix $\text{DIFF\_Before}_{lxr}$, $l_r$ represents the 1st row of elements in the first data matrix $\text{DIFF\_Before}_{lxr}$, n is the threshold, and the mean function indicates that an average value of each row of elements is taken.

For example, when a user touches a zone of the touchscreen with a finger, if the touchscreen is in an unstably grounded state, the value magnitudes of diff data of a touch point position of the user, which is obtained through computation by the user, are elevated. In this case, the apparatus for determining a touch position can determine whether unstable grounding occurs in the touchscreen based on initial diff data, remove, in a case that unstable grounding occurs, based on the foregoing filtering algorithm, baseline noise in the initial diff data caused by unstable grounding, and obtain an accurate touch point position based on the diff data without the baseline noise, thereby improving the accuracy in the touch.

It should be noted that the baseline noise measurement method in manner 2 consumes more computational resources but is more stable, so the baseline noise measurement method in manner 1 can be preferred in actual operation, and the filtering method in manner 2 can be used under anomalies occurring after trial debugging and testing.

Combining Table 1 and Table 2, Table 3 and Table 4 respectively show data obtained after processing diff data that is obtained in absence of any touch on the touchscreen and data obtained after processing diff data that is obtained in a case of reception of a one-finger touch on the touchscreen, where such data are obtained after execution of the foregoing filtering algorithm.

TABLE 3

Processed diff data in absence of any touch

| -1 | 0 | -1 | -2 | 1 | -1 | -2 | 3 | 0 | 0 | -2 | -2 | -3 | -2 | 1 | 0 | 0 | 0 |
|---|---|---|---|---|---|---|---|---|---|---|---|---|---|---|---|---|---|
| 0 | -4 | -3 | -1 | -1 | -3 | -3 | -3 | -3 | -3 | -1 | -3 | -2 | -2 | -1 | -1 | -2 | -1 |
| 0 | -1 | -1 | -1 | -1 | -3 | -1 | 3 | -3 | -2 | -3 | -1 | -2 | -1 | -2 | 0 | -2 | -1 |
| 0 | -5 | -5 | -4 | -3 | -2 | -5 | -2 | -3 | -3 | 6 | -2 | -6 | -2 | -1 | -6 | -4 | -1 |
| -1 | 1 | 0 | 1 | 0 | 1 | 2 | -1 | 1 | -3 | 0 | -1 | 0 | 1 | 1 | -1 | -1 | 0 |
| 0 | -2 | -3 | -3 | 1 | -1 | -3 | -1 | -2 | 4 | 1 | -5 | 0 | 1 | -1 | 2 | -3 | -1 |
| -1 | 3 | -2 | -3 | 1 | 0 | -1 | 0 | 1 | 0 | 0 | -1 | 0 | 0 | -1 | 1 | -2 | 1 |
| -1 | 1 | 0 | -3 | 1 | 2 | 0 | 1 | 3 | -2 | -1 | 0 | 1 | 0 | 2 | -1 | 1 | 1 |
| -4 | -3 | -4 | -3 | -3 | -5 | -3 | -3 | 0 | -3 | 1 | -3 | -2 | -2 | -2 | -3 | -5 | 4 |
| 0 | 2 | -1 | 0 | -2 | 0 | 3 | 1 | 0 | -2 | 2 | -1 | -2 | 4 | 0 | 0 | -2 | 0 |
| 1 | 6 | 1 | -1 | 0 | 4 | -1 | -1 | 0 | -1 | 0 | -1 | -1 | -2 | 0 | -1 | -1 | -1 |
| 0 | 2 | 1 | -1 | 0 | 0 | 0 | -4 | 0 | 0 | 1 | 0 | 1 | 5 | 2 | 2 | 0 | 0 |
| -1 | 0 | -4 | 0 | 0 | 0 | 0 | 1 | -1 | 1 | 3 | 0 | 2 | 1 | 1 | 1 | -1 | 1 |
| 2 | -1 | -3 | -2 | -2 | -3 | -1 | -3 | -1 | -1 | -2 | -2 | -2 | 1 | 0 | -2 | -4 | -3 |
| 2 | -2 | -4 | -3 | -2 | 0 | -1 | -2 | -4 | 0 | 1 | -1 | -2 | 2 | -2 | -2 | -3 | -2 |
| 2 | -3 | -2 | -4 | -2 | -1 | -2 | -2 | -1 | -2 | -1 | 0 | -3 | -1 | -2 | -1 | -1 | -3 |
| -1 | -2 | 0 | -3 | -1 | -1 | -1 | -2 | -1 | -1 | -1 | -3 | -1 | -3 | -1 | 4 | 0 | 0 |
| -2 | 3 | 6 | 0 | -1 | -2 | -2 | -2 | -2 | -1 | -2 | -2 | -1 | -3 | -3 | -1 | 1 | 2 |
| 1 | 1 | -4 | -1 | 0 | -4 | -1 | 1 | -1 | 1 | -1 | -1 | 2 | -3 | -1 | -1 | -1 | -2 |
| -1 | -1 | 0 | -1 | -1 | 0 | 4 | 2 | 0 | 0 | 0 | -2 | 0 | -2 | -1 | 0 | 2 | 1 |
| 0 | 1 | 1 | 1 | 2 | 1 | 1 | 2 | 1 | 0 | 1 | 2 | 0 | 1 | 0 | 1 | 0 | -1 |
| -1 | 1 | 4 | 3 | 2 | -1 | 3 | -4 | -1 | 0 | 1 | -2 | -1 | -2 | 1 | -1 | 3 | 0 |
| 0 | 0 | -1 | 0 | -1 | 2 | -2 | -2 | 0 | 0 | 1 | -1 | 1 | 2 | 2 | 1 | 0 | 0 |
| 0 | 0 | 0 | 2 | 2 | -1 | 0 | 4 | 2 | 1 | 0 | -1 | 0 | -1 | 2 | 1 | -2 | 0 |
| -1 | 0 | 0 | 0 | 0 | 2 | 4 | -1 | 0 | 3 | -1 | 2 | -2 | -1 | 0 | 1 | 0 | 1 |
| 0 | 2 | 1 | 4 | 0 | 0 | -2 | 0 | 5 | -1 | -2 | 1 | 2 | -2 | 1 | -1 | 0 | 0 |
| 1 | -2 | 5 | -1 | 1 | -1 | 0 | 0 | 4 | -2 | -1 | -1 | -1 | -1 | 3 | 0 | 0 | -2 |
| -2 | -2 | 9 | 12 | 11 | 13 | 21 | 18 | 2 | 3 | 4 | 0 | -4 | -3 | -1 | -2 | -2 | 1 |
| -2 | -1 | -1 | 15 | 16 | 21 | 30 | 27 | 13 | -1 | -1 | 1 | 1 | 0 | 0 | 0 | 0 | 1 |

TABLE 3-continued

Processed diff data in absence of any touch

| -1 | 8 | 4 | 26 | 17 | 31 | 14 | 25 | 12 | 5 | 0 | -3 | 0 | -2 | 0 | -1 | -1 | 1 |
|---|---|---|---|---|---|---|---|---|---|---|---|---|---|---|---|---|---|
| -1 | -3 | -1 | -3 | 2 | -3 | 0 | -2 | -2 | 0 | -4 | -4 | -3 | -3 | -1 | -2 | -3 | 0 |
| -1 | -3 | -1 | -1 | 0 | 0 | 0 | -2 | 0 | 0 | -4 | -1 | -3 | -1 | 1 | 0 | -1 | 0 |

TABLE 4

Processed diff data in the event of a one-finger touch

| 0 | -6 | -6 | 2 | -1 | -5 | 4 | 4 | 4 | 3 | 3 | 2 | 0 | 1 | 2 | -2 | -5 | -4 |
|---|---|---|---|---|---|---|---|---|---|---|---|---|---|---|---|---|---|
| -3 | -7 | -6 | 6 | 1 | 4 | -5 | 13 | 11 | 6 | 2 | -2 | -1 | -5 | -1 | -5 | -5 | -6 |
| -1 | -4 | -2 | 6 | -4 | -2 | -2 | 1 | 3 | 12 | -5 | 1 | 2 | 4 | 1 | 2 | -5 | -2 |
| -3 | 4 | -3 | -4 | 1 | -5 | -1 | -3 | 1 | 14 | 10 | -2 | 1 | -4 | -1 | -2 | -4 | -2 |
| -4 | -3 | -1 | -4 | 1 | -5 | -5 | 3 | 0 | 7 | 7 | 0 | 0 | -1 | -1 | 2 | -2 | 0 |
| -4 | -2 | 1 | -2 | -6 | -2 | -1 | 2 | 9 | 9 | 1 | 2 | -1 | 1 | -1 | -3 | 0 | 0 |
| 1 | 2 | 1 | -4 | -2 | 0 | 1 | -3 | 4 | 9 | 1 | 0 | -2 | -1 | -4 | -2 | 0 | -4 |
| -3 | -4 | 0 | 3 | -4 | 5 | -4 | 3 | 2 | 9 | 3 | 2 | 2 | -4 | -5 | -1 | -2 | 2 |
| -3 | 2 | -1 | -3 | -4 | -3 | -4 | 0 | 9 | 7 | 4 | -1 | -3 | -3 | -4 | 0 | 1 | 9 |
| -3 | 0 | -4 | -3 | -5 | -5 | -4 | 5 | 6 | 8 | 7 | 4 | 1 | -4 | -3 | -2 | 1 | 4 |
| 2 | 3 | 4 | -5 | -5 | 4 | -5 | -4 | 6 | 6 | 5 | 3 | 0 | -3 | -3 | -2 | -3 | -4 |
| 8 | 0 | -4 | 4 | 5 | 5 | -4 | 6 | -5 | 12 | -2 | -4 | -4 | -2 | -5 | -3 | 4 | -6 |
| 1 | 1 | 3 | 2 | -2 | 8 | -4 | -3 | -2 | 7 | 7 | -3 | -2 | -2 | -4 | -5 | -2 | -4 |
| 5 | -5 | 2 | -5 | 1 | 6 | 6 | 3 | 10 | 13 | 4 | -5 | -7 | -6 | -2 | -6 | -3 | -5 |
| -2 | -5 | 10 | 1 | 0 | -4 | 7 | 2 | 11 | 9 | 11 | -7 | -8 | -5 | -4 | -7 | -6 | -6 |
| -1 | -2 | 5 | -5 | 6 | 1 | 15 | 12 | 2 | 12 | 2 | -3 | -1 | -6 | -8 | -6 | -7 | -9 |
| 4 | -10 | -1 | 4 | 8 | 7 | 10 | -1 | 7 | 13 | 4 | -7 | 0 | -8 | -3 | -6 | -9 | -7 |
| 6 | 4 | -3 | 10 | 0 | -2 | 0 | 9 | 13 | 2 | 3 | -2 | -4 | -6 | -8 | -10 | -8 | -7 |
| 1 | -6 | 4 | -4 | 4 | 7 | 12 | 2 | 7 | 11 | -2 | -2 | -6 | -5 | -7 | -6 | -3 | -1 |
| -4 | -4 | -5 | 0 | -6 | -5 | -3 | 5 | 13 | 6 | 0 | 12 | 0 | 0 | 1 | -5 | 6 | -4 |
| 1 | 8 | 4 | -6 | 1 | 2 | -1 | -6 | 0 | 10 | 1 | -1 | -5 | -1 | -3 | -6 | 2 | -2 |
| 0 | -1 | -1 | 1 | -1 | 1 | 1 | 3 | 3 | 8 | 0 | -2 | -1 | -5 | -3 | -3 | 1 | 0 |
| 1 | -4 | -2 | 2 | -4 | -1 | 1 | 0 | 7 | 7 | 2 | 1 | -4 | -3 | -5 | -3 | -1 | 0 |
| -6 | 1 | -7 | 6 | -6 | -3 | 3 | 10 | 10 | 9 | 5 | 5 | -4 | -5 | -5 | -6 | -6 | -5 |
| -6 | -7 | -7 | -4 | -2 | -3 | -7 | 18 | 23 | 25 | 16 | -8 | -6 | 0 | -12 | -4 | -11 | -10 |
| 0 | 12 | 14 | 16 | 16 | 26 | 28 | 137 | 401 | 350 | 92 | 25 | 10 | 4 | 1 | 12 | 3 | 11 |
| 7 | 9 | 16 | 3 | 15 | 32 | 64 | 548 | 948 | 938 | 453 | 53 | 22 | 8 | 1 | 0 | 8 | 4 |
| 2 | 6 | 0 | 19 | 20 | 32 | 80 | 533 | 959 | 961 | 700 | 88 | 18 | 6 | 8 | 8 | 2 | 8 |
| 4 | 5 | 11 | 19 | 12 | 32 | 58 | 161 | 588 | 875 | 536 | 85 | 14 | 2 | 8 | 3 | 4 | 0 |
| 0 | 8 | 13 | 28 | 31 | 31 | 40 | 69 | 127 | 200 | 119 | 43 | 28 | 10 | 4 | 6 | 11 | 9 |
| 9 | 1 | 0 | 2 | 5 | 18 | 15 | 26 | 41 | 54 | 42 | 24 | 19 | 7 | 11 | 12 | 7 | 5 |
| 4 | 0 | 3 | 4 | 4 | 3 | 20 | 14 | 23 | 28 | 27 | 19 | 21 | 20 | 1 | 11 | 3 | 15 |

The data in Table 1 and Table 2 are filtered, and FIG. 3A to FIG. 6B are comparison diagrams of diff data before and after execution of the filtering algorithm.

Figure 3A:
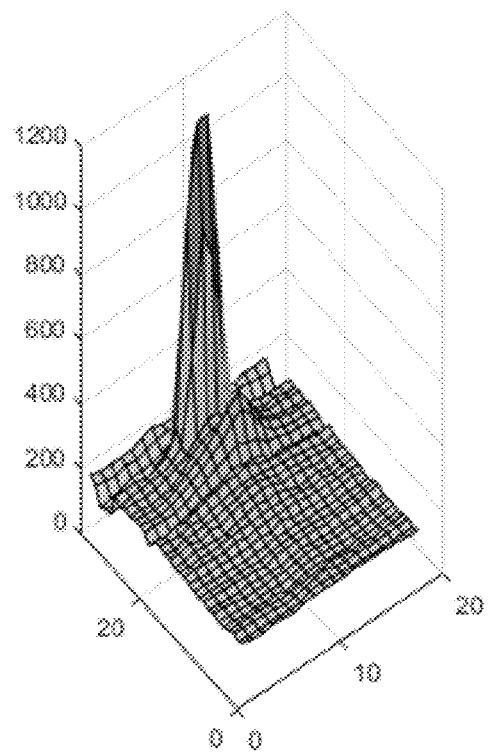
FIG. 3A is a first schematic diagram of size of data before and after processing according to an embodiment of this application.
Figure 3B:
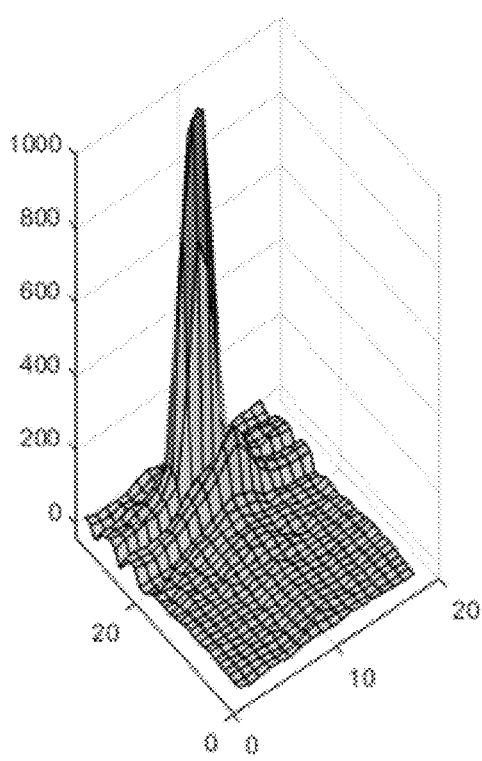
FIG. 3B is a second schematic diagram of size of data before and after processing according to an embodiment of this application.
Figure 4A:
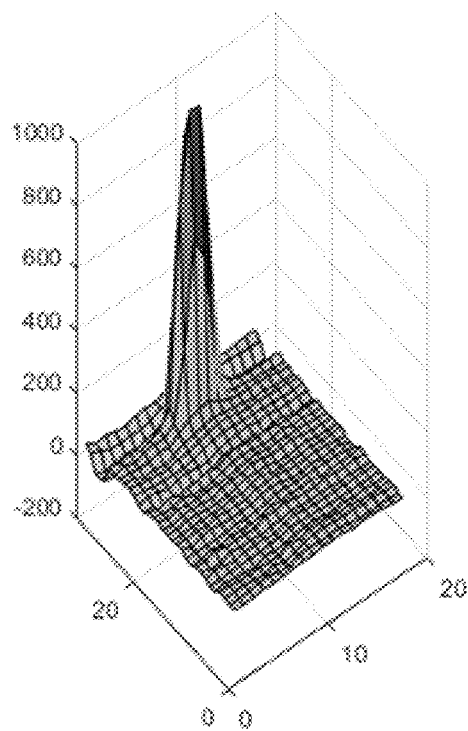
FIG. 4A is a third schematic diagram of size of data before and after processing according to an embodiment of this application.
Figure 4B:
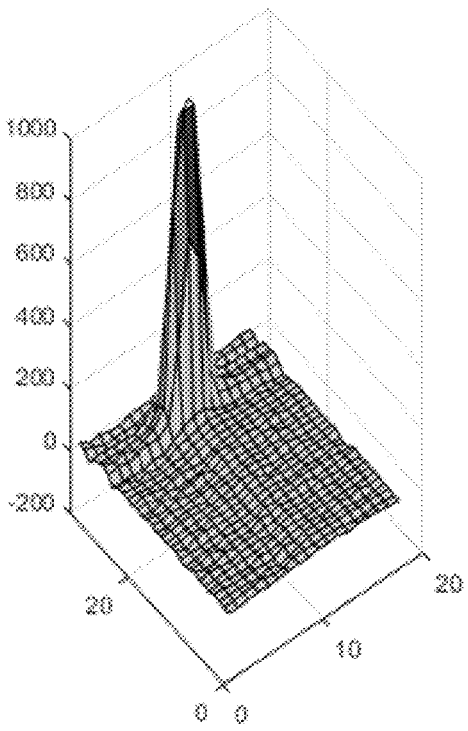
FIG. 4B is a fourth schematic diagram of size of data before and after processing according to an embodiment of this application.
Figure 5A:
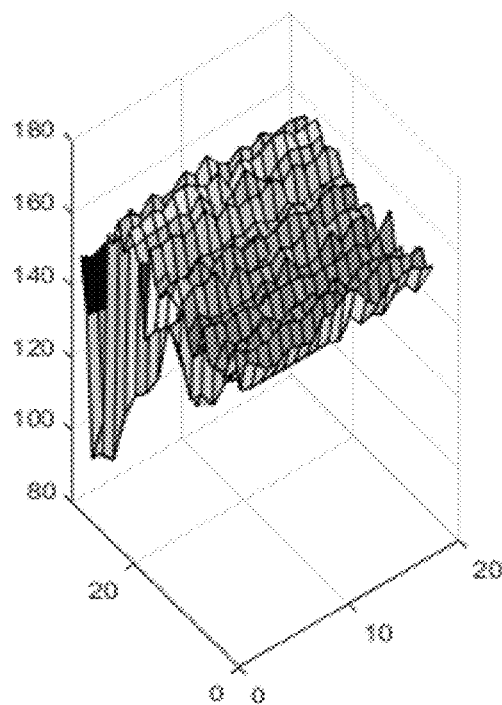
FIG. 5A is a fifth schematic diagram of size of data before and after processing according to an embodiment of this application.
Figure 5B:
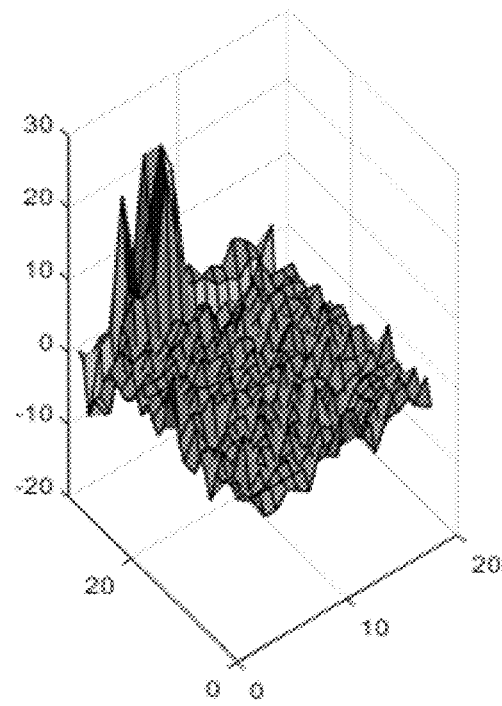
FIG. 5B is a sixth schematic diagram of size of data before and after processing according to an embodiment of this application.
Figure 6A:
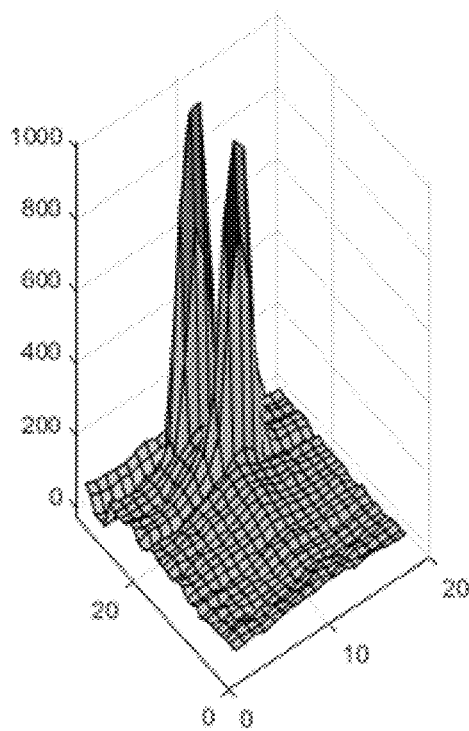
FIG. 6A is a seventh schematic diagram of size of data before and after processing according to an embodiment of this application.
Figure 6B:
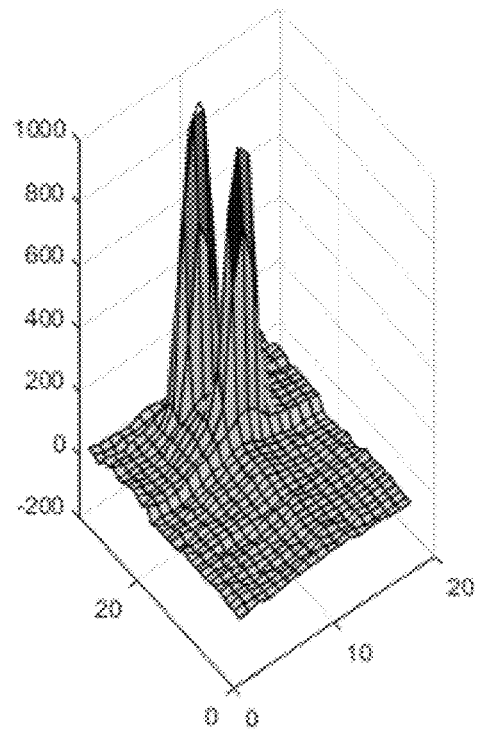
FIG. 6B is an eighth schematic diagram of size of data before and after processing according to an embodiment of this application.

FIG. 3A and FIG. 3B respectively show the comparison of the diff data before and after filtering in a case of unstable grounding (that is, the touchscreen is having an anomaly) in presence of touch. FIG. 4A and FIG. 4B respectively show the comparison of the diff data before and after filtering in a case of stable grounding (that is, the touchscreen is normal) in presence of touch. FIG. 5A and FIG. 5B respectively show the comparison of the diff data before and after filtering in a case of unstable grounding (that is, the touchscreen is normal) in absence of any touch. FIG. 6A and FIG. 6B respectively show the comparison of the diff data before and after filtering in a case of stable grounding (that is, the touchscreen is normal) in absence of any touch.

Step 104. Determine, based on the second data matrix, coordinate information of a touch point corresponding to the touch input.

Optionally, in an embodiment of this application, position coordinates of a touch point on the touchscreen can be obtained through execution of the touch algorithm on the second data matrix (that is, DIFF value matrix).

For example, the apparatus for determining a touch position can map the processed DIFF value matrix to the resolution of the touchscreen (that is, LCD) by using the centroid algorithm so as to obtain a coordinate value of a touch point.

In the method for determining a touch position provided in this embodiment of this application, after receiving a touch input by the user, a touch apparatus can perform the following operations: obtaining a first data matrix corresponding to initial capacitance data of a display, the first data matrix being a matrix including capacitance data of the display; in a case that the first data matrix meets a first preset condition, performing first processing on the first data matrix to obtain a second data matrix; and finally, determining, based on the second data matrix, coordinate information of a touch point corresponding to a touch operation of the user. Through this method, in a case of a display anomaly, for example, unstable grounding of the display, the apparatus for determining a touch position can process initial capacitance data of the touchscreen, for example, it can filter out the baseline noise in the initial capacitance data caused by the display anomaly. As a result, it is able to calculate correct touch point coordinates using the processed capacitance data, thereby improving the reliability and accuracy of the touch input on the display.

Optionally, in an embodiment of this application, the first data matrix includes L second element groups, each second element group including at least one second element, where L is a positive integer.

For example, the process of step 102 may include the following step 102a.

Step 102a. Determine the trigger matrix based on the first data matrix.

For example, the process of step 102a includes the following step 102a1.

Step 102a1. Take a difference between each second element in the second element group and an average value of a second element group in which the second element is located to obtain the trigger matrix.

The second element group is any one of the L second element groups.

It should be noted that the apparatus for determining a touch position can take a difference between each second element in each of the L second element groups and an average value of a second element group corresponding to each of the second element groups to obtain the trigger matrix.

For example, the L second element groups is a data matrix with l rows and r columns. The apparatus for determining a touch position can calculate an average value of each row of elements in the data matrix, and then subtract an average value of a corresponding row from each element (for example, subtracting an average value of the 2nd row from each element in the 2nd row) to obtain the trigger matrix.

For example, the process of step 102a1 can be implemented in the following program operation processes.

Optionally, the apparatus for determining a touch position can take an average value of elements in the first data matrix row by row to obtain new elements corresponding to each row of elements, and generate an L-row data matrix based on the new elements.

Optionally, i being equal to 1 indicates that an average value of the 1st row of elements in the first data matrix is calculated to obtain elements corresponding to the 1st row of data; i being equal to 2 indicates that an average value of the 2nd row of elements in the first data matrix is calculated to obtain elements corresponding to the 2nd row of data; and i being equal to L indicates that an average value of the L-th row of elements in the first data matrix is calculated to obtain elements corresponding to the L-th row of data. After the row-by-row calculation is completed, the L-row data matrix including the average value of each row of data can be obtained.

It should be noted that i is a variable used to traverse the entire first data matrix, and the value of i is greater than or equal to 1 and less than or equal to L.

Optionally, the apparatus for determining a touch position can multiply the L-row data matrix and an all-1 matrix with r rows and r columns to generate a data matrix with l rows and r columns that is the first matrix, and the first matrix may be referred to as the average value matrix of the first data matrix.

Optionally, the average value matrix is calculated based on the first data matrix and the all-1 matrix using the following formula:

$$A_{lxr} = \frac{1}{r} \text{DIFF\_Before}_{lxr} \begin{bmatrix} 1 & \cdots & 1 \\ \vdots & \ddots & \vdots \\ 1 & \cdots & 1 \end{bmatrix}_{rxr}, \qquad (1.2)$$

where l is the number of rows of the first data matrix, and the all-1 matrix is a matrix with r rows and r columns.

For example, a difference between the first data matrix and the first matrix is taken to obtain the trigger matrix, and the trigger matrix may be denoted as $\Delta_{lxr}$.

Optionally, the trigger matrix is calculated based on the first data matrix $\text{DIFF\_Before}_{lxr}$ and the average value matrix $A_{lxr}$ using the following formula:

$$\Delta_{lxr} = \frac{1}{r} \text{DIFF\_Before}_{lxr} - A_{lxr}, \qquad (1.3)$$

where r is the number of columns of the first data matrix $\text{DIFF\_Before}_{lxr}$, $A_{lxr}$ is the average value matrix of the first data matrix, and the matrix $\Delta_{lxr}$ is a matrix with l rows and r columns.

Optionally, in an embodiment of this application, the process of the foregoing step 103 may include the following steps 103a to 103c.

Step 103a. Take a difference between each second element in the first number of second element groups and an average value of a second element group in which the second element is located to obtain a first number of third element groups.

Step 103b. Take a difference between each second element in the third number of second element groups and a minimum value of a second element group in which the second element is located to obtain a third number of fourth element groups.

It should be noted that the apparatus for determining a touch position can take a difference between each of the first number of second element groups in the first data matrix and an average value of each of the first number of second element groups to obtain a first number of third element groups, and take a difference between each of the third number of second element groups in the first data matrix and a minimum value of each of the third number of second element groups to obtain a third number of fourth element groups.

Step 103c. Generate the second data matrix based on the first number of third element groups and the third number of fourth element groups.

The first number of second element groups are determined based on the first number of first element groups in the trigger matrix, the first number of first element groups are in one-to-one correspondence with the first number of second element groups, and the third number of second element groups are second element groups in the first data matrix other than the first number of second element groups.

For example, a second preset number is 15. Assuming that elements of the rows 1 to 18 in the trigger matrix (that is, the first number is 18) satisfies data consistency, that is, the first number of first element groups in the trigger matrix include the elements of the rows 1 to 18, the first number of second element groups in the first data matrix include the elements of the rows 1 to 18 in the first data matrix.

For example, the steps 103a to 103c may be replaced with the following steps 103a1 to step 103c1.

Step 103a1. In a case that the j-th first element group in the L first element groups meets a third preset condition, determine R fourth elements based on each first element in the j-th first element group and an average value of the j-th first element group to obtain the j-th fourth element group.

Step 103b1. In a case that the j-th first element group does not meet the third preset condition, determine R fifth elements based on a minimum value of the j-th first element group to obtain the j-th fifth element group.

Step 103c1. Obtain the second data matrix based on the fourth element group and/or the fifth element group.

For example, the third preset condition includes: that the first element group includes a second number of first elements, and an absolute value of each of the first number of first elements is less than the first preset threshold.

For example, the apparatus for determining a touch position determines row by row whether each row of elements in the first data matrix meet the third preset condition to perform corresponding filtering processing on each row of elements. Optionally, for the at least one row of elements that meet the third preset condition, an average value of the row of elements is subtracted from each element in the row of elements to obtain elements (that is, the fourth elements) after processing the row of elements; for the at least one row of elements that do not meet the third preset condition, a minimum value of the row of elements is subtracted from each element in the row of elements to obtain elements (that is, the fifth elements) after processing the row of elements; and finally, after all rows of elements are processed, a processed data matrix is generated based on the obtained processed elements.

It should be noted that similar to i, j is also a variable used to traverse the entire first data matrix, and the value of j is greater than or equal to 1 and less than or equal to L.

Optionally, j being equal to 1 indicates that it is determined whether the 1st row of elements in the first data matrix meet the third preset condition; if the 1st row of elements in the first data matrix meet the third preset condition, an average value of the row of elements is subtracted from the row of elements to obtain the row of processed elements (that is, the fourth elements); or if the 1st row of elements in the first data matrix do not meet the third preset condition, a minimum value of the row of elements is subtracted from the row of elements to obtain the row of processed elements (that is, the fifth elements); by analogy, j being equal to L indicates that it is determined whether the L-th row of elements in the first data matrix meet the third preset condition, and subsequent processing manners are the same as that when j is equal to 1. After completion of determining and calculating row by row, each row of processed elements can be obtained, and a new data matrix (that is, the second data matrix) is generated based on each row of processed elements.

Optionally, the second data matrix obtained by filtering the first data matrix has an expression as follows:

group includes M first elements, a value of each element in the M first elements is less than the first preset threshold, and M is greater than the third preset threshold.

For example, the apparatus for determining a touch position can determine at least one first element group meeting the second preset condition in the L first element groups in the first data matrix as a target element group. The target element group is an element group in the L first element groups that includes more than M1 elements having a value of less than D1, that is, an element group meeting the requirement for data consistency.

It should be noted that for the element group satisfying the data consistency, it is concluded through experimental test that the data obtained after the baseline noise is measured and filtered using the above average value is more accurate; and for the group of elements that do not satisfy the data consistency, it is concluded through experimental test that the data obtained after the baseline noise is measured and filtered using the above minimum value and filtered is more accurate.

With the method for determining a touch position provided in this application, it is determined whether each frame of diff data is in the unstably grounded state, filtering is performed if it is determined that the frame of diff data is in the unstably grounded state, the noise caused by unstable grounding is filtered out while data characteristics caused by touch are still retained, touch coordinate points are calculated using the filtered diff, and then coordinate values can be robustly and correctly calculated, without resulting in erratic touch inputs or rendering the touchscreen non-functional. The method can effectively improve the poor user experience generated by unstable grounding of the display caused by undesirable installation, drops, and aging.

It should be noted that the method for determining a touch position provided in this embodiment of this application may be performed by an apparatus for determining a touch position or a control module for performing the method for determining a touch position in the apparatus for determining a touch position. An apparatus for determining a touch position provided in an embodiment of this application is described by using an example in which the method for determining a touch position in this embodiment of this application is performed by the apparatus for determining a touch position.

Figure 7:
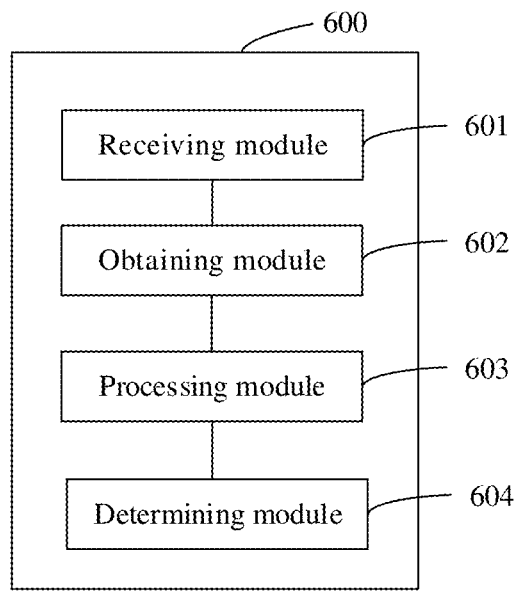
FIG. 7 is a schematic structural diagram of an apparatus for determining a touch position according to an embodiment of this application.

An embodiment of this application provides an apparatus 600 for determining a touch position. As shown in FIG. 7, the apparatus 600 includes a receiving module 601, an obtaining module 602, a processing module 603, and a (1.4)

$$\text{DIFF\_New}_{lxr} = \text{DIFF\_Before}_{lxr} - \begin{bmatrix} l_1(D < D1, M > M1)?\text{mean}(l_1) : \min(l_1) & \cdots & l_1(D < D1, M > M1)?\text{mean}(l_1) : \min(l_1) \\ & \ddots & \\ l_1(D < D1, M > M1)?\text{mean}(l_r) : \min(l_r) & \cdots & l_1(D < D1, M > M1)?\text{mean}(l_r) : \min(l_r) \end{bmatrix},$$

where

DIFF_New$_{lxr}$ represents the second data matrix, $l_l$ represents the 1st row of elements in the first data matrix DIFF_Before$_{lxr}$, $l_r$ represents the 1st row of elements in the first data matrix DIFF_Before$_{lxr}$, the mean function indicates that an average value of one row of elements is taken, and the min function indicates that the minimum value of one row of elements is taken.

Optionally, in an embodiment of this application, the second preset condition includes: that the j-th first element determining module 604, where the receiving module 601 is configured to receive a touch input by a user; the obtaining module 602 is configured to: in response to the touch input received by the receiving module 601, obtain a first data matrix of a display, the first data matrix being a matrix including capacitance data of the display; the processing module 603 is configured to: in a case that the first data matrix meets a first preset condition, perform first processing on the first data matrix obtained by the obtaining module 602 to obtain a second data matrix; and the determining module 604 is configured to determine, based on the second data matrix obtained by the processing module 603, coordinate information of a touch point corresponding to the touch input; where the first preset condition includes: that a trigger matrix corresponding to the first data matrix meets a second preset condition, where the trigger matrix is determined based on the first data matrix.

Optionally, in an embodiment of this application, the trigger matrix includes a first number of first element groups, with each of the first number of first element groups including a second number of first elements, and an absolute value of each of the second number of first elements being less than a first preset threshold; where the first number is greater than a second preset threshold, and the second number is greater than a third preset threshold.

Optionally, in an embodiment of this application, the determining module 603 is further configured to determine a trigger matrix based on the first data matrix obtained by the obtaining module 602. The determining module 603 is configured to take a difference between each second element in the second element group and an average value of a second element group in which the second element is located to obtain the trigger matrix, where the second element group is any one of the foregoing L second element groups.

Optionally, in an embodiment of this application, the apparatus 600 further includes a generating module 605. The processing module 603 is configured to take a difference between each second element in the first number of second element groups and an average value of a second element group in which the second element is located to obtain a first number of third element groups; the processing module 603 is also configured to take a difference between each second element in the third number of second element groups and a minimum value of a second element group in which the second element is located to obtain a third number of fourth element groups; and the generating module 605 is configured to generate the second data matrix based on the first number of third element groups and third number of fourth element groups obtained by the processing module; where the first number of second element groups are determined based on the first number of first element groups in the trigger matrix, the first number of first element groups are in one-to-one correspondence with the first number of second element groups, and the third number of second element groups are second element groups in the first data matrix other than the first number of second element groups.

In the apparatus for determining a touch position provided in this embodiment of this application, after receiving a touch input by the user, a touch apparatus can perform the following operations: obtaining a first data matrix corresponding to initial capacitance data of a display, the first data matrix being a matrix including capacitance data of the display; in a case that the first data matrix meets a first preset condition, performing first processing on the first data matrix to obtain a second data matrix; and finally, determining, based on the second data matrix, coordinate information of a touch point corresponding to a touch operation of the user. Through this method, in a case of a display anomaly, for example, unstable grounding of the display, the apparatus for determining a touch position can process initial capacitance data of the touchscreen, for example, it can filter out the baseline noise in the initial capacitance data caused by the display anomaly. As a result, it is able to calculate correct touch point coordinates using the processed capacitance data, thereby improving the reliability and accuracy of the touch input on the display.

The apparatus for determining a touch position in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, a vehicular electronic device, a wearable device, an ultra-mobile personal computer (UMPC), a netbook, a personal digital assistant (PDA), or the like; and the non-mobile electronic device may be a server, a network attached storage (NAS), a personal computer (PC), a television (TV), a teller machine, a self-service machine, or the like. This is not specifically limited in this embodiment of this application.

The apparatus for determining a touch position in this embodiment of this application may be an apparatus having an operating system. The operating system may be an android operating system, may be an iOS operating system, or may be another possible operating system. This is not specifically limited in the embodiments of this application.

The apparatus for determining a touch position provided in this embodiment of this application can implement the processes implemented in the method embodiments in FIG. 1 to FIG. 6B. To avoid repetition, details are not described herein again.

Figure 8:
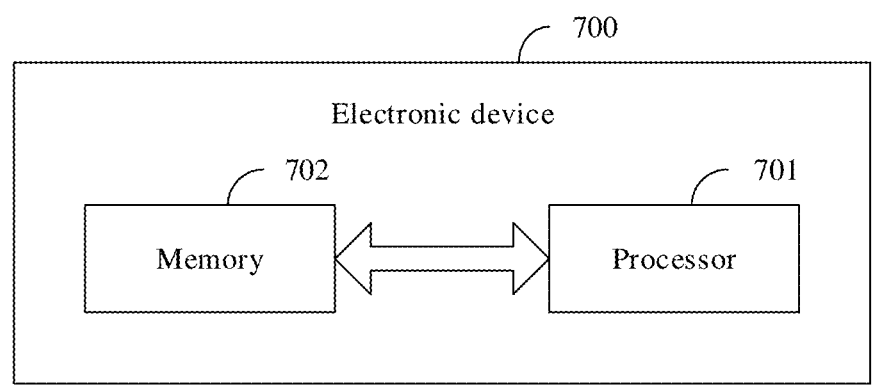
FIG. 8 is a first schematic structural diagram of hardware of an electronic device according to an embodiment of this application.

Optionally, as shown in FIG. 8, an embodiment of this application further provides an electronic device 700 including a processor 701, a memory 702, and a program or instruction stored in the memory 702 and capable of running on the processor 701, where when the program or instruction is executed by the processor 701, the processes of the method for determining a touch position in the foregoing embodiments are implemented, with the same technical effects achieved. To avoid repetition, details are not described herein.

It should be noted that the electronic device in this embodiment of this application includes the foregoing mobile electronic device and non-mobile electronic device.

Figure 9:
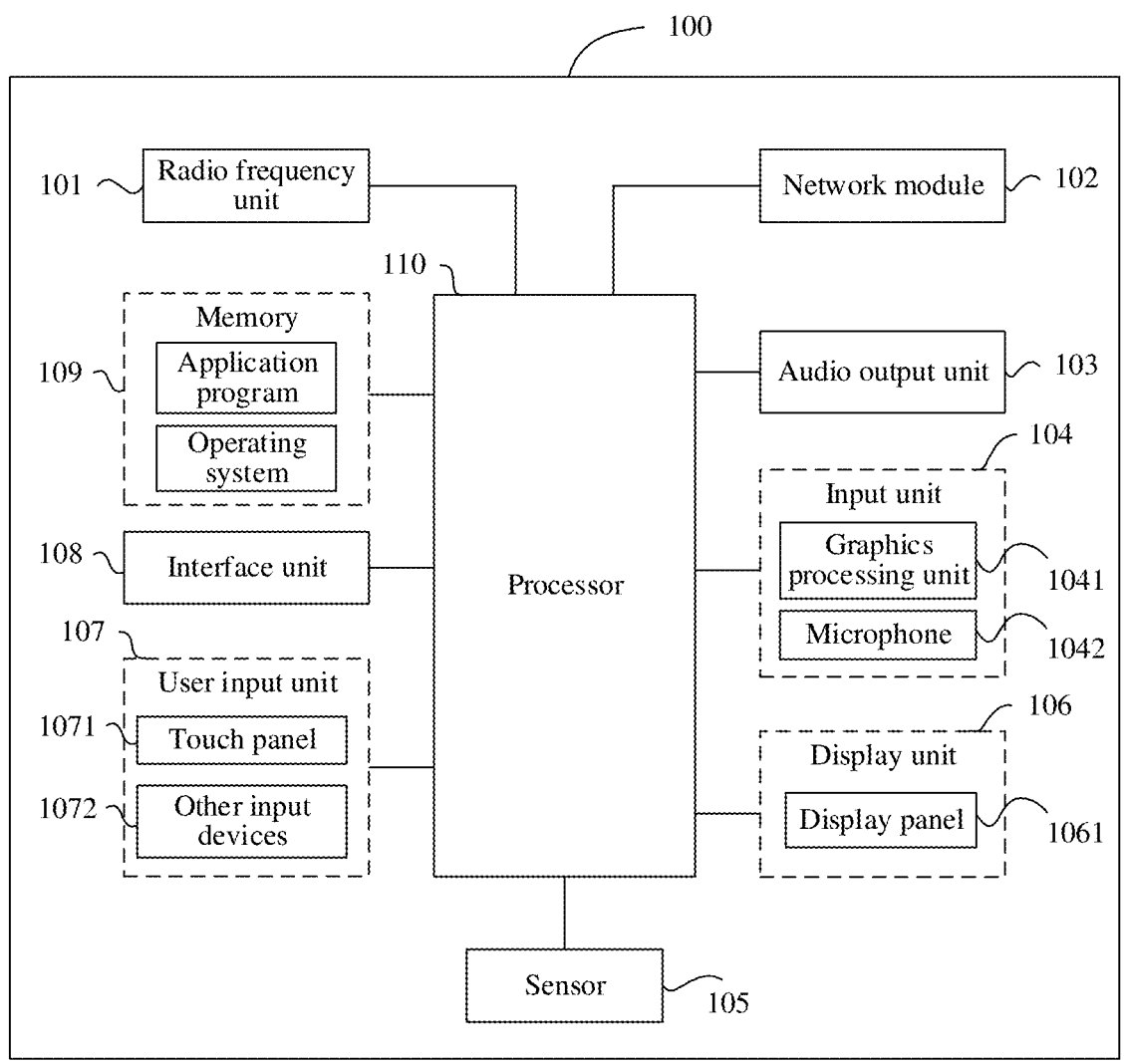
FIG. 9 is a second schematic structural diagram of hardware of an electronic device according to an embodiment of this application.

FIG. 9 is a schematic diagram of a hardware structure of an electronic device according to an embodiment of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

It can be understood by persons skilled in the art that the electronic device 100 may further include a power supply (for example, a battery) supplying power to the components. The power supply may be logically connected to the processor 110 via a power management system, so that functions such as charge management, discharge management, and power consumption management are implemented via the power management system. The structure of the electronic device shown in FIG. 9 does not constitute a limitation on the electronic device. The electronic device may include more or fewer components than shown in the drawing, or combine some of the components, or arrange the components differently. Details are not described herein.

The user input unit 107 is configured to receive a touch input by a user. The processor 110 is configured to: in response to the touch input received by the user input unit 107, obtain a first data matrix of a display, the first data matrix being a matrix including capacitance data of the display; the processor 110 is also configured to: in a case that the first data matrix meets a first preset condition, perform first processing on the obtained first data matrix to obtain a second data matrix; and the processor 110 is further configured to determine, based on the obtained second data matrix, coordinate information of a touch point corresponding to the touch input; where the first preset condition includes: that a trigger matrix corresponding to the first data matrix meets a second preset condition, where the trigger matrix is determined based on the first data matrix.

Optionally, in an embodiment of this application, the trigger matrix includes a first number of first element groups, with each of the first number of first element groups including a second number of first elements, and an absolute value of each of the second number of first elements being less than a first preset threshold; where the first number is greater than a second preset threshold, and the second number is greater than a third preset threshold.

Optionally, in an embodiment of this application, the processor 110 is further configured to determine a trigger matrix based on the obtained first data matrix. The processor 110 is configured to take a difference between each second element in the second element group and an average value of a second element group in which the second element is located to obtain the trigger matrix, where the second element group is any one of the foregoing L second element groups.

Optionally, in an embodiment of this application, the processor 110 is configured to take a difference between each second element in the first number of second element groups and an average value of a second element group in which the second element is located to obtain a first number of third element groups; the processor 110 is also configured to take a difference between each of the third number of second element groups in the first data matrix and a minimum value of each of the third number of second element groups to obtain a third number of fourth element groups; and the processor 110 is further configured to generate the second data matrix based on the first number of third element groups and the third number of fourth element groups obtained; where the first number of second element groups are determined based on the first number of first element groups in the trigger matrix, the first number of first element groups are in one-to-one correspondence with the first number of second element groups, and the third number of second element groups are second element groups in the first data matrix other than the first number of second element groups.

In the electronic device provided in this embodiment of this application, after receiving a touch input by the user, a touch apparatus can perform the following operations: obtaining a first data matrix corresponding to initial capacitance data of a display, the first data matrix being a matrix including capacitance data of the display; in a case that the first data matrix meets a first preset condition, performing first processing on the first data matrix to obtain a second data matrix; and finally, determining, based on the second data matrix, coordinate information of a touch point corresponding to a touch operation of the user. Through this method, in a case of a display anomaly, for example, unstable grounding of the display, the apparatus for determining a touch position can process initial capacitance data of the touchscreen, for example, it can filter out the baseline noise in the initial capacitance data caused by the display anomaly. As a result, it is able to calculate correct touch point coordinates using the processed capacitance data, thereby improving the reliability and accuracy of the touch input on the display.

It should be understood that in this embodiment of this application, the input unit 104 may include a graphics processing unit (GPU) 1041 and a microphone 1042. The graphics processing unit 1041 processes image data of a static picture or a video that is obtained by an image capture apparatus (for example, a camera) in a video capture mode or an image capture mode. The display unit 106 may include a display panel 1061. The display panel 1061 may be configured in a form of a liquid crystal display, an organic light-emitting diode display, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a functional button (such as a volume control button or a power on/off button), a trackball, a mouse, and a joystick. Details are not described herein. The memory 109 may be configured to store software programs and various data including but not limited to application programs and operating systems. The processor 110 may integrate an application processor and a modem processor. The application processor mainly processes the operating system, a user interface, an application program, and the like. The modem processor mainly processes wireless communication. It can be understood that the modem processor may alternatively be not integrated in the processor 110.

An embodiment of this application further provides a non-transitory readable storage medium, where the non-transitory readable storage medium stores a program or instruction, and when the program or instruction is executed by a processor, the processes of the method for determining a touch position in the foregoing embodiments are implemented, with the same technical effects achieved. To avoid repetition, details are not described herein again.

The processor is the processor in the electronic device in the foregoing embodiments. The non-transitory readable storage medium includes a non-transitory computer-readable storage medium such as a computer read-only memory (ROM), a random access memory (RAM), a magnetic disk, or an optical disc.

Another embodiment of this application provides a chip, where the chip includes a processor and a communication interface, the communication interface is coupled to the processor, and the processor is configured to run a program or instruction to implement the processes of the method for determining a touch in the foregoing embodiments, with the same technical effects achieved. To avoid repetition, details are not described herein again.

It should be understood that the chip in the embodiments of this application may also be referred to as a system-level chip, a system chip, a chip system, a system-on-chip, or the like.

An embodiment of this application further provides a computer program product, where the program product is stored in a non-volatile storage medium, and the program product is executed by at least one processor to implement the processes of the method for determining a touch position in the foregoing embodiments, with the same technical effects achieved.

It should be noted that in this specification, the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

From the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a non-transitory storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing embodiments. These embodiments are merely for illustration rather than limitation. Inspired by this application, persons of ordinary skill in the art may develop many other forms without departing from the essence of this application and the protection scope of the claims, and all such forms shall fall within the protection scope of this application.

What is claimed is:

1. A method for determining a touch position, wherein the method comprises:
   receiving a touch input by a user;
   in response to the touch input, obtaining a first data matrix of a display, the first data matrix being a matrix comprising capacitance data of the display;
   in a case that the first data matrix meets a first preset condition, performing first processing on the first data matrix to obtain a second data matrix; and
   determining, based on the second data matrix, coordinate information of a touch point corresponding to the touch input; wherein
   the first preset condition comprises: that a trigger matrix corresponding to the first data matrix meets a second preset condition, wherein the trigger matrix is determined based on the first data matrix;
   wherein the second preset condition comprises:
   that the trigger matrix comprises a first number of first element groups, with each of the first number of first element groups comprising a second number of first elements, and an absolute value of each of the second number of first elements being less than a first preset threshold; wherein
   the first number is greater than a second preset threshold, and the second number is greater than a third preset threshold.

2. The method according to claim 1, wherein the first data matrix comprises L second element groups, each second element group comprising at least one second element, wherein L is a positive integer; and after the obtaining a first data matrix of a display, the method further comprises:
   determining the trigger matrix based on the first data matrix; wherein
   the determining the trigger matrix based on the first data matrix comprises:
   taking a difference between each second element in a second element group and an average value of a second element group in which the second element is located to obtain the trigger matrix, wherein the second element group is any one of the L second element groups.

3. A computer program product, wherein the computer program product is executed by at least one processor to implement the method for determining a touch position according to claim 2.

4. A chip, wherein the chip comprises a processor and a communication interface, wherein the communication interface is coupled to the processor, and the processor is configured to run a program or instruction to implement the method for determining a touch position according to claim 2.

5. The method according to claim 1, wherein the in a case that the first data matrix meets a first preset condition, performing first processing on the first data matrix to obtain a second data matrix comprises:
   taking a difference between each second element in a first number of second element groups and an average value of a second element group in which the second element is located to obtain a first number of third element groups;
   taking a difference between each second element in a third number of second element groups and a minimum value of a second element group in which the second element is located to obtain a third number of fourth element groups; and
   generating the second data matrix based on the first number of third element groups and the third number of fourth element groups; wherein
   the first number of second element groups are determined based on the first number of first element groups in the trigger matrix, the first number of first element groups are in one-to-one correspondence with the first number of second element groups, and the third number of second element groups are second element groups in the first data matrix other than the first number of second element groups.

6. A computer program product, wherein the computer program product is executed by at least one processor to implement the method for determining a touch position according to claim 5.

7. A chip, wherein the chip comprises a processor and a communication interface, wherein the communication interface is coupled to the processor, and the processor is configured to run a program or instruction to implement the method for determining a touch position according to claim 5.

8. A computer program product, wherein the computer program product is executed by at least one processor to implement the method for determining a touch position according to claim 1.

9. A chip, wherein the chip comprises a processor and a communication interface, wherein the communication interface is coupled to the processor, and the processor is configured to run a program or instruction to implement the method for determining a touch position according to claim 1.

10. An electronic device, comprising a processor, a memory, and a program or instruction stored in the memory and capable of running on the processor, wherein the program or instruction, when executed by the processor, causes the electronic device to perform:

receiving a touch input by a user;

in response to the touch input, obtaining a first data matrix of a display, the first data matrix being a matrix comprising capacitance data of the display;

in a case that the first data matrix meets a first preset condition, performing first processing on the first data matrix to obtain a second data matrix; and determining, based on the second data matrix, coordinate information of a touch point corresponding to the touch input; wherein the first preset condition comprises: that a trigger matrix corresponding to the first data matrix meets a second preset condition, wherein the trigger matrix is determined based on the first data matrix;

wherein the second preset condition comprises:

that the trigger matrix comprises a first number of first element groups, with each of the first number of first element groups comprising a second number of first elements, and an absolute value of each of the second number of first elements being less than a first preset threshold; wherein the first number is greater than a second preset threshold, and the second number is greater than a third preset threshold.

11. The electronic device according to claim 10, wherein the first data matrix comprises L second element groups, each second element group comprising at least one second element, wherein L is a positive integer; and the program or instruction, when executed by the processor, causes the electronic device to further perform:

determining the trigger matrix based on the first data matrix; and the program or instruction, when executed by the processor, causes the electronic device to perform:

taking a difference between each second element in a second element group and an average value of a second element group in which the second element is located to obtain the trigger matrix, wherein the second element group is any one of the L second element groups.

12. The electronic device according to claim 10, wherein the program or instruction, when executed by the processor, causes the electronic device to perform:

taking a difference between each second element in a first number of second element groups and an average value of a second element group in which the second element is located to obtain a first number of third element groups;

taking a difference between each second element in a third number of second element groups and a minimum value of a second element group in which the second element is located to obtain a third number of fourth element groups; and generating the second data matrix based on the first number of third element groups and the third number of fourth element groups; wherein the first number of second element groups are determined based on the first number of first element groups in the trigger matrix, the first number of first element groups are in one-to-one correspondence with the first number of second element groups, and the third number of second element groups are second element groups in the first data matrix other than the first number of second element groups.

13. A non-transitory readable storage medium, wherein the non-transitory readable storage medium stores a program or instruction, and the program or instruction, when executed by a processor of an electronic device, causes the electronic device to perform:

receiving a touch input by a user;

in response to the touch input, obtaining a first data matrix of a display, the first data matrix being a matrix comprising capacitance data of the display;

in a case that the first data matrix meets a first preset condition, performing first processing on the first data matrix to obtain a second data matrix; and determining, based on the second data matrix, coordinate information of a touch point corresponding to the touch input; wherein the first preset condition comprises: that a trigger matrix corresponding to the first data matrix meets a second preset condition, wherein the trigger matrix is determined based on the first data matrix;

wherein the second preset condition comprises:

that the trigger matrix comprises a first number of first element groups, with each of the first number of first element groups comprising a second number of first elements, and an absolute value of each of the second number of first elements being less than a first preset threshold; wherein the first number is greater than a second preset threshold, and the second number is greater than a third preset threshold.

14. The non-transitory readable storage medium according to claim 13, wherein the first data matrix comprises L second element groups, each second element group comprising at least one second element, wherein L is a positive integer; and the program or instruction, when executed by the processor, causes the electronic device to further perform:

determining the trigger matrix based on the first data matrix; and the program or instruction, when executed by the processor, causes the electronic device to perform:

taking a difference between each second element in a second element group and an average value of a second element group in which the second element is located to obtain the trigger matrix, wherein the second element group is any one of the L second element groups.

15. The non-transitory readable storage medium according to claim 13, wherein the program or instruction, when executed by the processor, causes the electronic device to perform:

taking a difference between each second element in a first number of second element groups and an average value of a second element group in which the second element is located to obtain a first number of third element groups;

taking a difference between each second element in a third number of second element groups and a minimum value of a second element group in which the second element is located to obtain a third number of fourth element groups; and generating the second data matrix based on the first number of third element groups and the third number of fourth element groups; wherein the first number of second element groups are determined based on the first number of first element groups in the trigger matrix, the first number of first element groups are in one-to-one correspondence with the first number of second element groups, and the third number of second element groups are second element groups in the first data matrix other than the first number of second element groups.

\* \* \* \* \*